(12) United States Patent
Ghosh

(10) Patent No.: US 10,375,738 B2
(45) Date of Patent: Aug. 6, 2019

(54) USER STATION (STA) AND ACCESS POINT (AP) AND METHOD FOR RANDOM ACCESS CONTENTION USING CASCADED TRIGGER FRAMES

(71) Applicant: Intel IP Corporation, Santa Clara, CA (US)

(72) Inventor: Chittabrata Ghosh, Fremont, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/644,949

(22) Filed: Jul. 10, 2017

(65) Prior Publication Data

US 2018/0077731 A1 Mar. 15, 2018

Related U.S. Application Data

(63) Continuation of application No. 14/747,210, filed on Jun. 23, 2015, now Pat. No. 9,706,577.

(Continued)

(51) Int. Cl.
*H04W 74/08* (2009.01)
*H04L 5/00* (2006.01)
*H04W 74/00* (2009.01)
*H04W 84/12* (2009.01)
*H04W 52/02* (2009.01)

(52) U.S. Cl.
CPC ....... *H04W 74/0833* (2013.01); *H04L 5/0023* (2013.01); *H04L 5/0053* (2013.01); *H04L 5/0091* (2013.01); *H04W 74/006* (2013.01); *H04L 5/0064* (2013.01); *H04W 52/0216* (2013.01); *H04W 84/12* (2013.01)

(58) Field of Classification Search
None
See application file for complete search history.

(56) References Cited

U.S. PATENT DOCUMENTS 9,706,577 B2 7/2017 Ghosh et al.
2007/0147423 A1 6/2007 Wentink
(Continued)

FOREIGN PATENT DOCUMENTS

EP 3254518 A1 12/2017

OTHER PUBLICATIONS

"U.S. Appl. No. 14/747,210, Non Final Office Action dated Oct. 28, 2016", 26 pgs.

(Continued)

*Primary Examiner* — Rebecca E Song
(74) *Attorney, Agent, or Firm* — Schwegman Lundberg & Woessner, P.A.

(57) ABSTRACT

Embodiments of a user station (STA), access point (AP), and method for random access contention in a wireless network are generally described herein. The STA may receive, from the AP, a beacon frame for a beacon interval. The STA may further receive a first random access Trigger Frame (TF) that indicates a first allocation of channel resources for random access contention by STAs during a first uplink transmission period of the beacon interval. The beacon frame may include a transmission timing for the first random access TF and a first TF cascade type for the first random access TF. The first TF cascade type may indicate whether a next TF is a random access TF or a scheduled access TF.

25 Claims, 6 Drawing Sheets

Related U.S. Application Data

(60) Provisional application No. 62/146,671, filed on Apr. 13, 2015.

(56) References Cited

U.S. PATENT DOCUMENTS

| | | |
|---|---|---|
| 2013/0235773 A1 | 9/2013 | Wang et al. |
| 2016/0113034 A1 | 4/2016 | Seok |
| 2016/0242070 A1 | 8/2016 | Asterjadhi et al. |
| 2016/0302232 A1 | 10/2016 | Ghosh |
| 2018/0167882 A1* | 6/2018 | Choi ................... H04W 84/12 |

OTHER PUBLICATIONS

"U.S. Appl. No. 14/747,210, Notice of Allowance dated Mar. 9, 2017", 9 pgs.

"U.S. Appl. No. 14/747,210, Response filed Jan. 30, 2017 to Non Final Office Action dated Oct. 28, 2016", 8 pgs.

"European Application Serial No. 16780402.0, Extended European Search Report dated Nov. 6, 2018", 8 pgs.

Ryu, Kiseon, "UL MU Procedure;11-15-0365-00-00ax-ul-mu-procedure", IEEE-SA Mentor. Piscataway. NJ USA, vol. 802.11ax., (Mar. 9, 2015), 1-16 pgs.

* cited by examiner

USER STATION (STA) AND ACCESS POINT (AP) AND METHOD FOR RANDOM ACCESS CONTENTION USING CASCADED TRIGGER FRAMES

PRIORITY CLAIM

This application is a continuation of U.S. patent application Ser. No. 14/747,210, filed Jun. 23, 2015, now issued as U.S. Pat. No. 9,706,577, which claims priority under 35 USC 119(e) to U.S. Provisional Patent Application Ser. No. 62/146,671, filed Apr. 13, 2015, each of which is incorporated herein by reference in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax study group (SG) (named DensiFi). Some embodiments relate to high-efficiency (HE) wireless or high-efficiency WLAN or Wi-Fi (HEW) communications. Some embodiments relate to multi-user (MU) multiple-input multiple-output (MIMO) communications and orthogonal frequency division multiple access (OFDMA) communication techniques. Some embodiments relate to random access contention techniques.

BACKGROUND

Wireless communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low in moderate data rate requirements (with respect to the very high data rates of IEEE 802.11ac). A recently-formed study group for Wi-Fi evolution referred to as the IEEE 802.11 High Efficiency WLAN (HEW) study group (SG) (i.e., IEEE 802.11ax) is addressing these high-density deployment scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
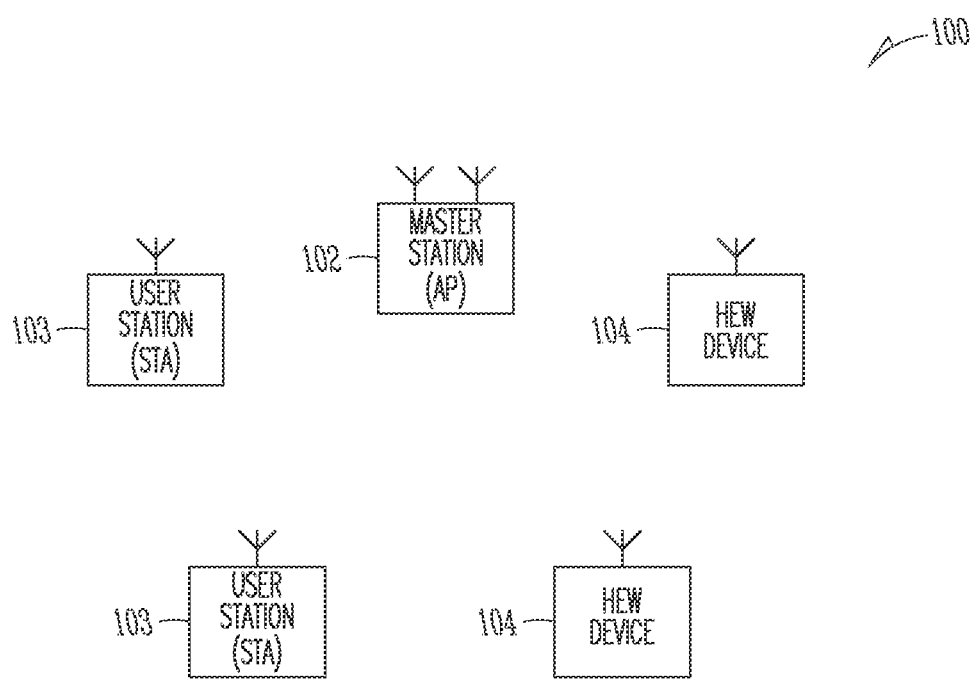
FIG. 1 illustrates a wireless network in accordance with some embodiments.

FIG. 1 illustrates a wireless network in accordance with some embodiments. In some embodiments, the network 100 may be a High Efficiency Wireless Local Area Network (HEW) network. In some embodiments, the network 100 may be a Wireless Local Area Network (WLAN) or a Wi-Fi network. These embodiments are not limiting, however, as the network 100 may include a combination of such networks. That is, the network 100 may support HEW devices in some cases, non HEW devices in some cases, and a combination of HEW devices and non HEW devices in some cases. Accordingly, it is understood that although techniques described herein may refer to either a non HEW device or to an HEW device, such techniques may be applicable to both non HEW devices and HEW devices in some cases.

The network 100 may include a master station (STA) 102, a plurality of user stations (STAs) 103 and a plurality of HEW stations 104 (HEW devices). The master station 102 may be arranged to communicate with the STAs 103, HEW stations 104 and the legacy stations 106 in accordance with one or more of the IEEE 802.11 standards. In accordance with some HEW embodiments, an access point may operate as the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 using one or more HEW frames. During the HEW control period, legacy stations 106 may refrain from communicating. In some embodiments, the master-sync transmission may be referred to as a control and schedule transmission.

In some embodiments, the STA 103 may receive, from the AP 102, a beacon frame for a beacon interval. The STA 103 may further receive a first random access Trigger Frame (TF) that indicates a first allocation of channel resources for random access contention by STAs 103 during a first uplink transmission period of the beacon interval. These embodiments will be described in more detail below.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (SDMA) (MU-MIMO) technique. These multiple-access techniques used during the HEW control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HEW stations 104 outside the HEW control period in accordance with legacy IEEE 802.11 communication techniques, although this is not a requirement.

In some embodiments, the HEW communications during the control period may be configurable to use one of 20 MHz, 40 MHz, or 80 MHZ contiguous bandwidths or an 80+80 MHz (160 MHz) non-contiguous bandwidth. In some embodiments, a 320 MHz channel width may be used. In some embodiments, subchannel bandwidths less than 20 MHz may also be used. In these embodiments, each channel or subchannel of an HEW communication may be configured for transmitting a number of spatial streams.

In accordance with embodiments, a master station 102 and/or HEW stations 104 may generate an HEW packet in accordance with a short preamble format or a long preamble format. The HEW packet may comprise a legacy signal field (L-SIG) followed by one or more high-efficiency (HE) signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency) Wi-Fi operation.

Figure 2:
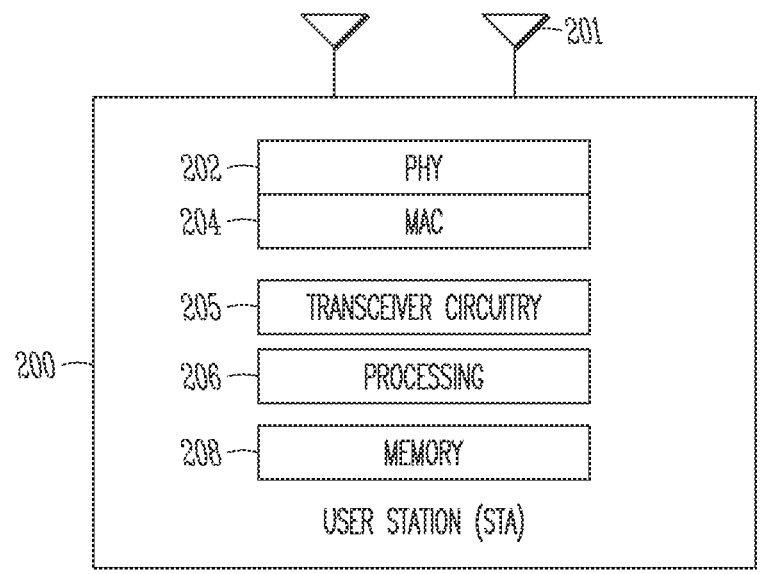
FIG. 2 illustrates a user station (STA) and an access point (AP) in accordance with some embodiments.
Figure 2:
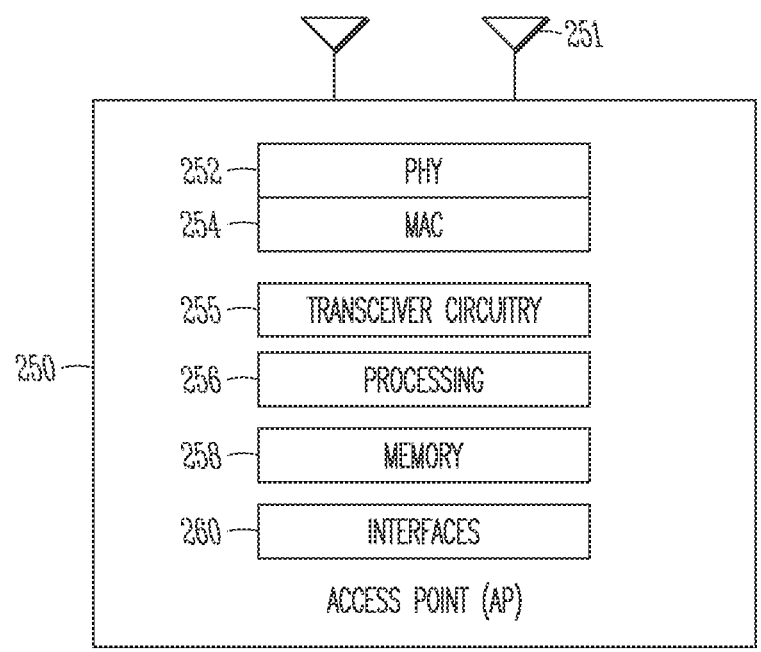

FIG. 2 illustrates a user station (ST) and an access point (AP) in accordance with some embodiments. It should be noted that in some embodiments, the AP 102 may be a stationary non-mobile device. The STA 200 may be suitable for use as an STA 103 as depicted in FIG. 1, while the AP 250 may be suitable for use as an AP 102 as depicted in FIG. 1. In addition, the STA 200 may also be suitable for use as an HEW device 104 as shown in FIG. 1, such as an HEW station.

The STA 200 may include physical layer circuitry 202 and a transceiver 205, one or both of which may enable transmission and reception of signals to and from the AP 250, other APs, other STAs or other devices using one or more antennas 201. As an example, the physical layer circuitry 202 may perform various encoding and decoding functions that may include formation of baseband signals for transmission and decoding of received signals. As another example, the transceiver 205 may perform various transmission and reception functions such as conversion of signals between a baseband range and a Radio Frequency (RF) range. Accordingly, the physical layer circuitry 202 and the transceiver 205 may be separate components or may be part of a combined component. In addition, some of the described functionality related to transmission and reception of signals may be performed by a combination that may include one, any or all of the physical layer circuitry 202, the transceiver 205, and other components or layers.

The AP 250 may include physical layer circuitry 252 and a transceiver 255, one or both of which may enable transmission and reception for transmission and reception of signals to and from the STA 200, other APs, other STAs or other devices using one or more antennas 251. The physical layer circuitry 252 and the transceiver 255 may perform various functions similar to those described regarding the STA 200 previously. Accordingly, the physical layer circuitry 252 and the transceiver 255 may be separate components or may be part of a combined component. In addition, some of the described functionality related to transmission and reception of signals may be performed by a combination that may include one, any or all of the physical layer circuitry 252, the transceiver 255, and other components or layers.

The STA 200 may also include medium access control layer (MAC) circuitry 204 for controlling access to the wireless medium, while the AP 250 may also include medium access control layer (MAC) circuitry 254 for controlling access to the wireless medium. The STA 200 may also include processing circuitry 206 and memory 208 arranged to perform the operations described herein. The AP 250 may also include processing circuitry 256 and memory 258 arranged to perform the operations described herein. The AP 250 may also include one or more interfaces 260, which may enable communication with other components, including other APs 102 (FIG. 1). In addition, the interfaces 260 may enable communication with other components that may not be shown in FIG. 1, including components external to the network 100. The interfaces 260 may be wired or wireless or a combination thereof.

The antennas 201, 251 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 251 may be effectively separated to take advantage of spatial diversity and the different channel characteristics that may result.

In some embodiments, the STA 200 or the AP 250 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 200 or AP 250 may be configured to operate in accordance with 802.11 standards, although the scope of the embodiments is not limited in this respect. While devices or other devices in some embodiments may be configured to operate according to other protocols or standards, including other IEEE standards, Third Generation Partnership Project (3GPP) standards or other standards. In some embodiments, the STA 200, AP 250 or other device may include one or more of a keyboard, a display, a non-volatile memory port, multiple antennas, a graphics processor, an application processor, speakers, and other mobile device elements. The display may be an LCD screen including a touch screen.

Although the STA 200 and the AP 250 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 200 and/or AP 250 may include various components of the STA 200 and/or AP 250 as shown in FIG. 2. Accordingly, techniques and operations described herein that refer to the STA 200 (or 103 or 104) may be applicable to an apparatus for an STA. In addition, techniques and operations described herein that refer to the AP 250 (or 102) may be applicable to an apparatus for an AP.

In some embodiments, the STA 200 may be configured as an HEW device 104 (FIG. 1), and may communicate using OFDM communication signals over a multicarrier communication channel. Accordingly, in some cases the STA 200 may be configured to receive signals in accordance with specific communication standards, such as the Institute of Electrical and Electronics Engineers (IEEE) standards including IEEE 802.11—2012, 802.11n—2009 and/or 802.11ac—2013 standards and/or proposed specifications for WLANs including proposed HEW standards, although the scope of the invention is not limited in this respect as they may also be suitable to transmit and/or receive communications in accordance with other techniques and standards. In some other embodiments, the STA 200 configured as an HEW device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

Embodiments disclosed herein provide two preamble formats for High Efficiency (HE) Wireless LAN standards specification that is under development in the IEEE Task Group 11ax (TGax).

In accordance with embodiments, the STA 103 may receive, from the AP 102, a beacon frame for a beacon interval. The STA 103 may further receive a first random access Trigger Frame (TF) that indicates a first allocation of channel resources for random access contention by STAs 103 during a first uplink transmission period of the beacon interval. The beacon frame may include a transmission timing for the first random access TF and a first TF cascade type for the first random access TF. The first TF cascade type may indicate whether a next TF is a random access TF or a scheduled access TF. These embodiments will be described in more detail below.

In some embodiments, the channel resources may be used for downlink transmission by the AP 102 and for uplink transmissions by the STAs 103. That is, a time-division duplex (TDD) format may be used. In some cases, the channel resources may include multiple channels, such as the 20 MHz channels previously described. The channels may include multiple sub-channels or may be divided into multiple sub-channels for the uplink transmissions to accommodate multiple access for multiple STAs 103. The downlink transmissions may or may not utilize the same format.

In some embodiments, the downlink sub-channels may comprise a predetermined bandwidth. As a non-limiting example, the sub-channels may each span 2.03125 MHz, the channel may span 20 MHz, and the channel may include eight or nine sub-channels. Although reference may be made to a sub-channel of 2.03125 MHz for illustrative purposes, embodiments are not limited to this example value, and any suitable frequency span for the sub-channels may be used. In some embodiments, the frequency span for the sub-channel may be based on a value included in an 802.11 standard (such as 802.11ax), a 3GPP standard or other standard.

In some embodiments, the sub-channels may comprise multiple sub-carriers. Although not limited as such, the sub-carriers may be used for transmission and/or reception of OFDM or OFDMA signals. As an example, each sub-channel may include a group of contiguous sub-carriers spaced apart by a pre-determined sub-carrier spacing. As another example, each sub-channel may include a group of non-contiguous sub-carriers. That is, the channel may be divided into a set of contiguous sub-carriers spaced apart by the pre-determined sub-carrier spacing, and each sub-channel may include a distributed or interleaved subset of those sub-carriers. The sub-carrier spacing may take a value such as 78.125 kHz, 312.5 kHz or 15 kHz, although these example values are not limiting. Other suitable values that may or may not be part of an 802.11 or 3GPP standard or other standard may also be used in some cases. As an example, for a 78.125 kHz sub-carrier spacing, a sub-channel may comprise 26 contiguous sub-carriers or a bandwidth of 2.03125 MHz.

Figure 3:
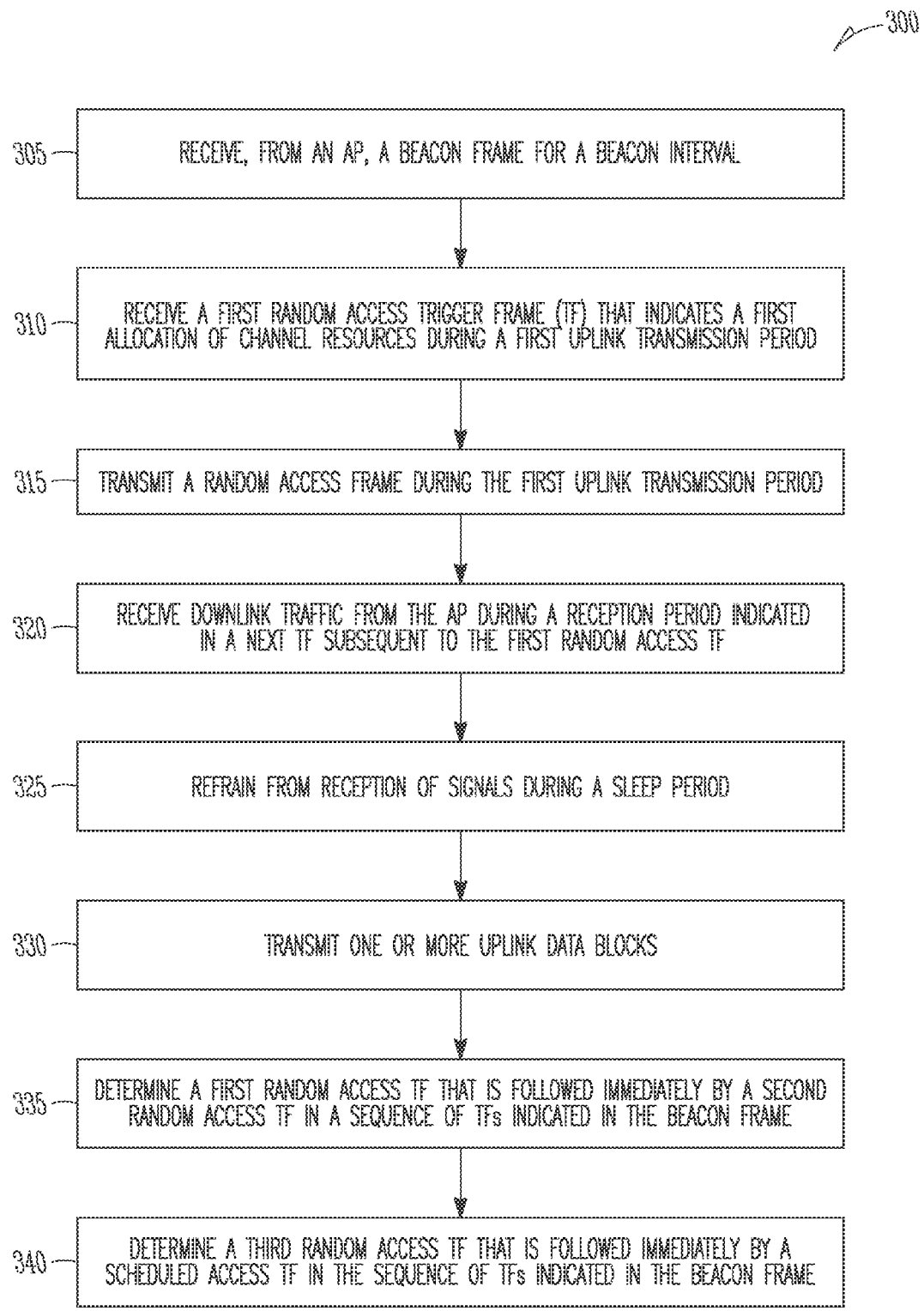
FIG. 3 illustrates the operation of a method of random access contention in accordance with some embodiments.

FIG. 3 illustrates the operation of a method of random access contention in accordance with some embodiments. It is important to note that embodiments of the method 300 may include additional or even fewer operations or processes in comparison to what is illustrated in FIG. 3. In addition, embodiments of the method 300 are not necessarily limited to the chronological order that is shown in FIG. 3. In describing the method 300, reference may be made to FIGS. 1-2 and 4-6, although it is understood that the method 300 may be practiced with any other suitable systems, interfaces and components.

In addition, while the method 300 and other methods described herein may refer to STAs 103 and APs 102 operating in accordance with 802.11 or other standards, embodiments of those methods are not limited to just those devices and may also be practiced on other mobile devices, such as an HEW STA, an HEW AP, an Evolved Node-B (eNB) or User Equipment (UE). In some embodiments, the STA 103 described in the method 300 may be an HEW STA 103 while the AP 102 may be an HEW AP 102. The method 300 and other methods described herein may also be practiced by wireless devices configured to operate in other suitable types of wireless communication systems, including systems configured to operate according to various Third Generation Partnership Project (3GPP) Long Term Evolution (LTE) standards. The method 300 may also refer to an apparatus for an STA 103 and/or AP 102 or other device described above.

At operation 305 of the method 300, the STA 103 may receive, from the AP 102, a beacon frame for a beacon interval. In some embodiments, the beacon frame may indicate a sequence of random access trigger frames (TFs) and scheduled access TFs to be transmitted by the AP 102 during the beacon interval. The TFs may indicate timings for one or more uplink transmission periods of the beacon interval, which may be for random access, scheduled access or other communication. The beacon interval may also be referred to as a beacon window or beacon period.

In some embodiments, the beacon frame may include one or more random access TFs and one or more scheduled access TFs. As an example, multiple random access TFs may be cascaded (adjacent in a sequence of TFs scheduled for transmission by the AP 102). As another example, a scheduled access TF may be transmitted in between a first random access TF and a second random access TF in such a sequence.

In some embodiments, the beacon frame may include TF cascade types for some or all of the scheduled random access TFs. In some embodiments, the TF cascade type for a particular random access TF may indicate whether a next scheduled TF is a random access TF or a scheduled access TF. The beacon frame may also include transmission timings for some or all of the scheduled random access TFs to indicate when they are scheduled to be transmitted by the AP 102.

Figure 4:
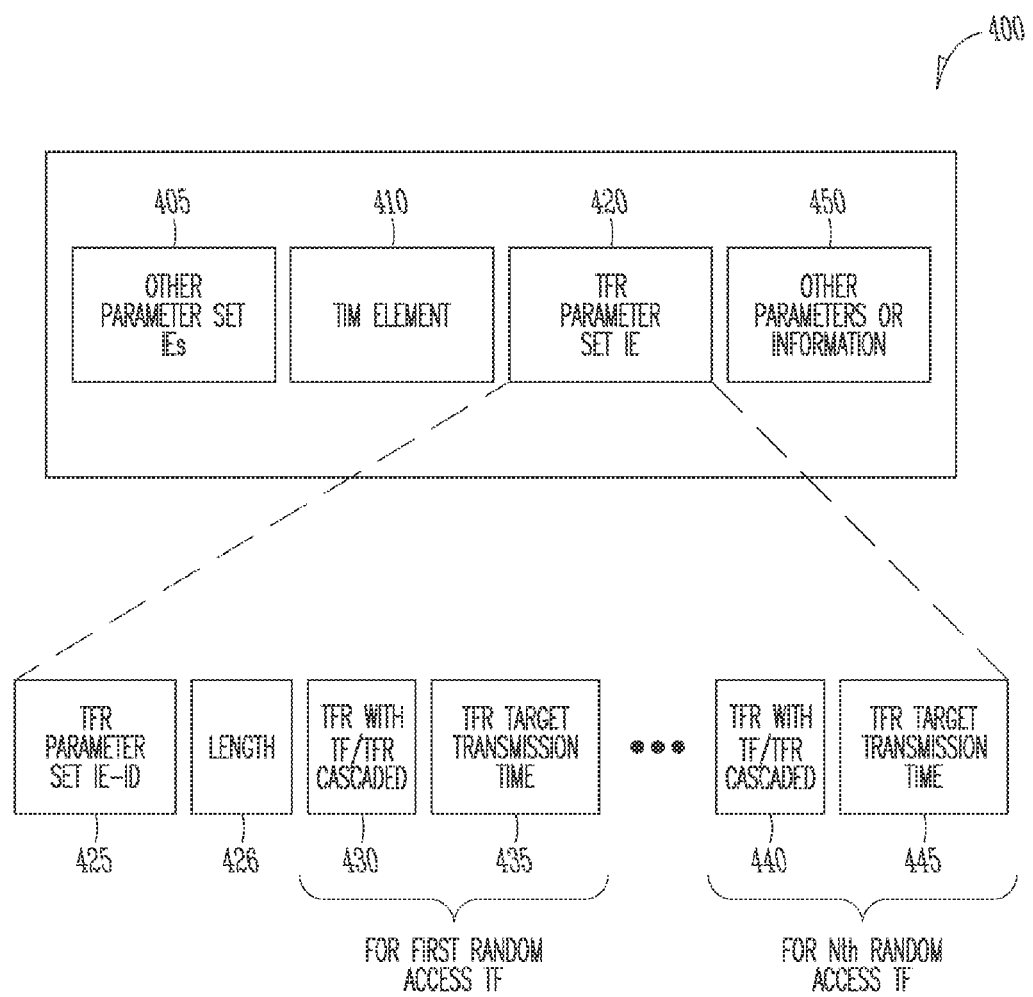
FIG. 4 illustrates an example of a beacon frame in accordance with some embodiments.

FIG. 4 illustrates an example of a beacon frame in accordance with some embodiments. It should be noted that embodiments are not limited by the ordering, format or presentation of the parameters and information as shown in FIG. 4. In addition, some embodiments of the beacon frame 400 may or may not include some or all of the parameters and information shown, and may also include additional parameters and information not shown in FIG. 4.

The beacon frame 400 may include a TFR parameter set information element (IE) 420, which will be described in more detail below. The beacon frame 400 may also include any number (including zero) of other parameter set IEs 405. In some embodiments, some or all of such parameter set IEs 405 may be defined or included in a standard such as 802.11, although not limited as such.

The beacon frame 400 may also include a traffic indication map (TIM) element 410. In some embodiments, the TIM element 410 may indicate to the STAs 103 whether or not there is downlink traffic to be sent from the AP 102 to the STAs 103 during the beacon interval. As an example, each of multiple STAs 103 may be allocated one bit of a bitmap included in the TIM element 410, and the AP 102 may set the bit for a particular STA 103 to a value of 0 or 1 to indicate whether downlink traffic is scheduled for that STA 103. Embodiments are not limited to a single bit per STA 103, however, and other suitable arrangements may be used in some cases.

The TFR parameter set IE 420 may include a TFR parameter set IE identifier 425 which may include suitable control information for the TFR parameter set IE 420. The length field 426 may indicate a length of the TFR parameter set IE 420 (or a portion of it) in octets, bits, bytes or other unit, but is not limited as such. For instance, the length field 426 may also indicate a number of parameters included in the TFR parameter set IE 420 or a number of random access TFs.

The TFR parameter set IE 420 may also include information related to random access TFs (TFRs) scheduled for transmission during the beacon interval. In some embodiments, the TFR parameter set IE 420 may include one or parameters for each scheduled random access TF. As an example, for a first random access TF, the TFR with TF/TFR cascaded indicator 430 may indicate whether a next scheduled TF is a random access TF or a scheduled access TF. The next scheduled TF may refer to a TF that immediately follows the first random access TF in a sequence of TFs scheduled for transmission during the beacon frame. Accordingly, the TFR with TF/TFR cascaded indicator 430 may indicate whether or not the first TFR is cascaded with another TFR. It should be noted that the TFR with TF/TFR cascaded indicator 430 may be an example of a TF cascade type.

In addition, the TFR target transmission time 435 may indicate a timing (starting time or other time) for the first random access TF. Any suitable time measurement or frame index may be used for such purposes. As an example, a scheduled transmission time for the first random access TF with respect to the start of the beacon interval or other reference point may be used. Such a value may be specified in terms of seconds, milliseconds or similar, or may be given in terms of a number of elapsed clock samples. It should be noted that the TFR target transmission time 435 may be an example of a transmission timing.

As shown in the example in FIG. 4, the TFR parameter set IE 420 may include similar parameters for additional scheduled random access TFs beyond the first random access TF. For instance, the Nth random access TF may be described by the TFR with TF/TFR cascaded indicator 440 and the TFR target transmission time 445 may be included. It should be noted that embodiments are not limited to the number of random access TFs shown in the example in FIG. 4.

The beacon frame 400 may also include any number (including zero) of other parameters or information 450, which may or may not be related to random access. For instance, control information for the beacon frame 400 may be included.

At operation 310, a first random access TF may be received at the STA 103. In some embodiments, the first random access TF may be received according to the transmission timing indicated for the first random access TF in the beacon frame. In some embodiments, the first random access TF may indicate a first allocation of channel resources for random access contention by STAs during a first uplink transmission period of the beacon interval. The channel resources may include multiple sub-channels, in some cases. Each of the sub-channels may comprise a predetermined bandwidth and may further comprise multiple sub-carriers. As an example, a portion of the channel resources (or a number of sub-channels) may be allocated by the AP 102 for the random access. As another example, all of the sub-channels may be allocated for the random access.

In addition, other random access TFs scheduled for transmission during the beacon interval may indicate allocations of channel resources for other uplink transmission periods of the beacon interval, which may or may not be the same for different random access TFs. For instance, a second random access TF may indicate second channel resources for a second uplink transmission period, and the second channel resources may or may not be the same as the first channel resources indicated in the first random access TF for the first uplink transmission period.

As previously described, the beacon frame may include information about multiple random access TFs. In some cases, the STA 103 may receive multiple random access TFs, and may receive at least some of them according to transmission timings indicated for those random access TFs in the beacon frame. In addition, the STA 103 may also receive one or more scheduled access TFs in the beacon frame.

Figure 5:
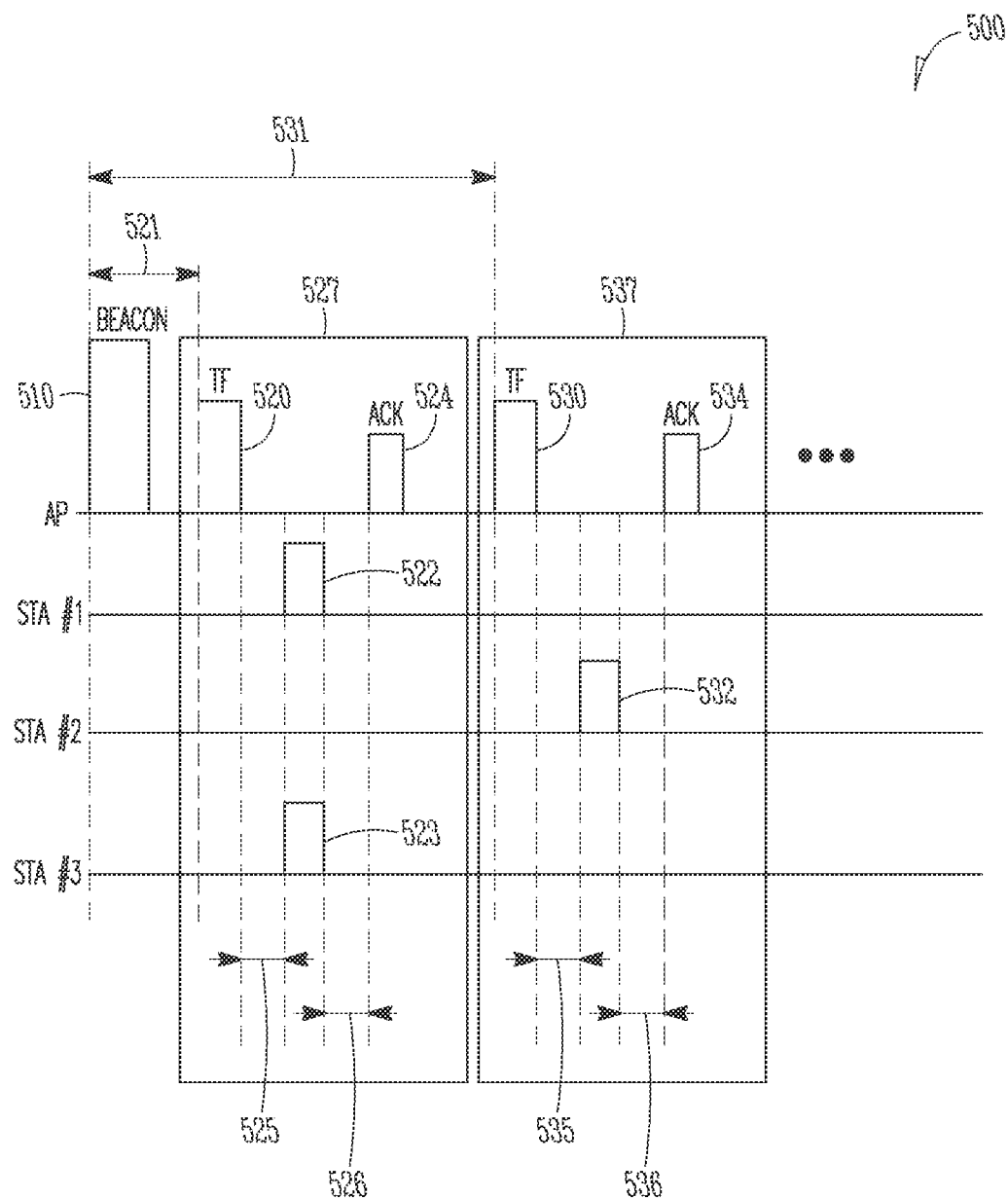
FIG. 5 illustrates an example of a random access scenario in accordance with some embodiments.

FIG. 5 illustrates an example of a random access scenario in accordance with some embodiments. It should be noted that the scenario 500 may serve to illustrate some or all of the concepts and techniques described herein, but embodiments are not limited to the example scenario 500. For instance, embodiments are not limited to the number of STAs 103, TFs, and ACKs shown in FIG. 5. Embodiments are also not limited to the arrangement and ordering shown in FIG. 5.

The beacon frame 510 may be transmitted by the AP 102 for reception at the STA 103, which are numbered as STA #1, STA #2, and STA #3 in the example scenario 500. The AP 102 may also transmit any number of TFs such as 520, 530, which may include random access TFs, scheduled access TFs or a combination of both types of TFs. As an example, the first scheduled TF 520 may be transmitted according to a transmission timing 521 with respect to the beacon frame 510. As an example, when the first TF 520 is a random access TF, the transmission timing 521 may be included in the beacon frame 510 as part of the TFR parameter set IE 420 (FIG. 4) or other message or block. The transmission timing 521 may also be considered a "doze time" from the perspective of the STAs 103. Accordingly, the STAs 103 may enter a sleep mode or a mode of reduced operation after decoding the beacon frame 510 and before the reception of the first TF 520.

As previously described, the first TF 520 may indicate sub-channel allocations for random access for the STAs when it is a random access TF. When the first TF 520 is a scheduled access TF, it may indicate sub-channel allocations for dedicated uplink transmissions by the STAs 103. As an example, when the first TF 520 is a random access TF, the beacon frame 510 may include a TF cascade type for the first TF 520 to indicate whether the second TF 530 is a random access TF or a scheduled access TF.

The first STA #1 may transmit an uplink transmission 522, which may be a random access message, uplink traffic message or other message. The third STA #3 may transmit an uplink transmission 523. These transmissions may occur after a short inter-frame space (SIFS) 525 has elapsed with respect to the first TF 520. The AP 102 may transmit an ACK 524 after the SIFS 526 has elapsed, which may include acknowledgements or other information related to receptions of the uplink transmissions 522, 523. It should be noted that embodiments are not limited to the use of the SIFS 525, 526 as shown in FIG. 5, as any suitable value may be used for such a delay.

For ease of illustration, the first TF 520, the uplink transmissions 522, 523, the ACK 524, and the SITS 525, 526 are demarcated by the box 527. A similar box 537 is populated with similar elements 530-536 to indicate a second TF 530 used in the beacon interval. In some cases, additional TFs may also be included in a similar manner, as embodiments are not limited to the example of two TFs in FIG. 5.

At operation 315, a random access frame may be transmitted by the STA 103 during the first uplink transmission period according to the first allocation of the channel resources. As an example, the random access frame may be a buffer request frame, association request (AR) frame or probe request (PR) frame or other management, control or action frame. However, any other suitable frame, block or message that may or may not be part of a standard, such as 802.11, may be used. In some cases, the STA 103 may determine an uplink transmission period (such as the first one) in which to transmit random access frames based at least partly on an included TIM in the beacon frame and one or more TF cascade types. Examples of such will be described below. These examples are not limiting, however, as a selection of a particular uplink transmission period by the STA 103 may be performed using any suitable technique, including random selection of the scheduled uplink transmission periods for the random access.

At operation 320, downlink traffic may be received from the AP 102 during a reception period indicated in a scheduled access TF. In some embodiments, the scheduled access TF may be the next TF after a random access TF, although the scope of embodiments is not limited in this respect. As previously described, a TIM element may be included in the beacon frame and may indicate that the STA 103 is scheduled to receive downlink traffic from the AP 102 during the beacon interval. Accordingly, when the STA 103 determines that it has at least some downlink traffic scheduled for the beacon interval, the STA 103 may receive one or more scheduled access TFs to determine timing, channel resources and other information to enable the reception of the downlink traffic.

At operation 325, the STA 103 may refrain from reception of signals during one or more sleep periods in the beacon interval. As an example, a sleep period may occur between the scheduled access TF and a reception period for the downlink traffic. In some embodiments, the STA 103 may also refrain from transmission of signals and other operations, and may reduce its functionality and power usage during the sleep period. Accordingly, the STA 103 may operate in a reduced power state or battery saving state or similar.

At operation 330, the STA 103 may transmit one or more uplink traffic messages, data blocks, packets or uplink signals, which may or may not be related to random access. The transmission may be performed during one or more uplink transmission periods indicated by random access TFs, although embodiments are not limited in this respect. It should be pointed out that, although the uplink transmission periods may be indicated in random access TFs, the messages, data blocks, packets or signals transmitted by the STA 103 during those periods need not be related to random access. As an example, a first uplink transmission period indicated by the first random access TF may be used. As another example, a second uplink transmission period indicated by a second random access TF may also be used. Although not limited as such, the second random access TF may immediately follow, or be cascaded with, the first random access TF. In addition, any suitable number of uplink transmission periods may be used, including more than two.

Various techniques may be used for determination of how the uplink transmission periods may be used for transmission of the uplink traffic. As an example, an uplink message may be divided such that a portion of it is transmit end during each of multiple uplink transmission periods. As another example, the uplink message may be repeated during each of multiple uplink transmission periods, which may enable diversity reception at the AP 102.

In some cases, channel resources allocated for random access during the multiple uplink transmission periods may be different. In addition, the STA 103 may utilize different portions of the allocated channel resources during different uplink transmission periods. As an example, uplink transmission may be performed by the STA 103 according to the first allocation of the channel resources during the first uplink transmission period. The uplink transmission during the second uplink transmission period may be performed according to a second allocation of the channel resources during the second uplink transmission period. As a non-limiting example, the second allocation of the channel resources may be indicated by the next TF.

In some embodiments, a random access portion of the channel resources may be indicated by a random access Association Identifier (AID). That is, a particular AID may be reserved for communication of the random access portion to the STAs 103. For instance, a value of 0 for the AID (AID-0) may be reserved for this purpose. Information may be included in the beacon frame along with AID-0, and the STAs 103 may use the information to identify which sub-channels are included in the random access portion. It should be noted that the value of 0 is a nonlimiting example, and other suitable values may be used.

At operation 335, the STA 103 may determine a first random access TF that is followed immediately by a second random access TF in the sequence of scheduled TFs in the beacon frame. That is, the STA 103 may identify, based on the beacon frame, when a cascaded sequence of at least two random access TFs is scheduled for transmission during the beacon interval. In some embodiments, the determination may be based at least partly on one or more TF cascade types included in the beacon frame. That is, the STA 103 may parse or analyze the beacon frame to identify a random access TF for which an included TF cascade type is set to an appropriate value (0 or 1, for instance) to indicate that the next scheduled TF is another random access TF.

As such, the STA 103 may be able to wake up for reception of multiple cascaded random access TFs and then may enter a sleep mode without the need for reception of any other TFs. The determination of the cascaded sequence of random access TFs by analysis of the beacon frame may therefore enable the STA 103 to increase an amount of sleep time during the beacon interval in comparison to techniques in which multiple TFs are received in sequence without such knowledge.

As an example, the STA 103 may operate as an Internet of Things (IoT) device or as a Machine Type Communication (MTC) device. Such a device may have limited battery power or may benefit from operation in which battery expenditure is reduced or limited. For instance, it may be beneficial for the IoT or MTC device to wake up as infrequently as possible during the beacon frame for reception of TFs and/or transmission of data. An uplink data message sent by the IoT or MTC device may be used for communication of a block of data such as sensor data. The block may be a relatively small block of data, and transmission of it during a small number of uplink transmission periods may be appropriate. The transmission of the uplink data blocks may be performed when the TIM included in the beacon frame indicates that the STA 103 is not scheduled to receive downlink traffic from the AP 102 during the beacon interval.

At operation 340, the STA 103 may determine, based on TF cascade types included in the beacon frame, a third random access TF that is followed immediately by a scheduled access TF in the sequence of scheduled TFs in the beacon frame. As a non-limiting example, the determination may be performed when the TIM indicates that the STA 103 is scheduled to receive downlink traffic from the AP 102 during the beacon interval. In addition, the STA 103 may transmit a random access message during a third uplink transmission period indicated by the third random access TF and may receive the downlink traffic during an uplink transmission period indicated by the scheduled access TF. Although not limited as such, these operations just described may be performed when the STA 103 operates in a power saving mode or operates as a power saving STA 103 or similar.

It should be pointed out that operation according to the examples in which certain patterns of random access TFs and scheduled access TFs are identified using the beacon frame may serve to control the random access per random access TF. That is, random access attempts by the STAs 103 during the beacon frame may be spread out over the available random access TFs.

Figure 6:
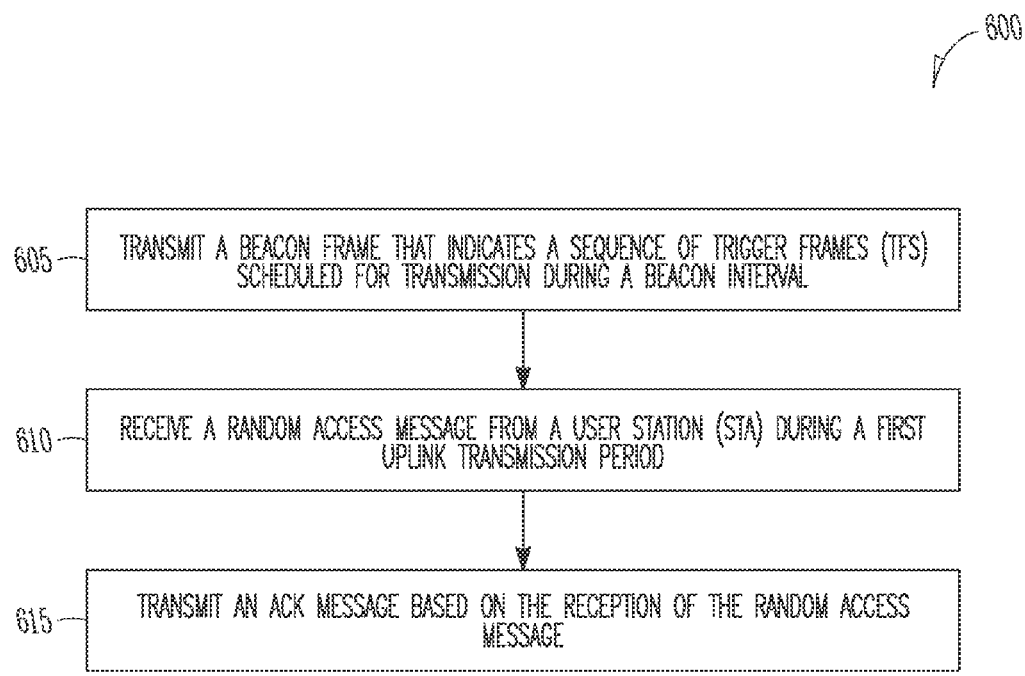
FIG. 6 illustrates the operation of another method of random access contention in accordance with some embodiments.

FIG. 6 illustrates the operation of another method of random access contention in accordance with some embodiments. As mentioned previously regarding the method 300, embodiments of the method 600 may include additional or even fewer operations or processes in comparison to what is illustrated in FIG. 6 and embodiments of the method 600 are not necessarily limited to the chronological order that is shown in FIG. 6. In describing the method 600, reference may be made to FIGS. 1-5, although it is understood that the method 600 may be practiced with any other suitable systems, interfaces and components. In addition, embodiments of the method 600 may refer to APs, STAs, eNBs 104, UEs 102, HEW APs, HEW STAs or other wireless or mobile devices. The method 600 may also refer to an apparatus for an STA 103 and/or AP 102 or other device described above.

It should be noted that the method 600 may be practiced at an AP 102, and may include exchanging of signals or messages with an STA 103. Similarly, the method 300 may be practiced at the STA 103, and may include exchanging of signals or messages with the AP 102. In some cases, operations and techniques described as part of the method 300 may be relevant to the method 600. In addition, embodiments may include operations performed at the AP 102 that are reciprocal or similar to other operations described herein performed at the STA 103. For instance, an operation of the method 600 may include transmission of a frame by the AP 102 while an operation of the method 300 may include reception of the same frame or similar frame by the STA 103.

In addition, previous discussion of various techniques and concepts may be applicable to the method 600 in some cases, including the beacon frame, beacon interval, random access TFs, scheduled access TFs, and cascading of TFs. Other concepts previously described, such as the channel resources, sub-channels, and sub-carriers may also be applicable to the method 600. In addition, the example scenario shown in FIG. 5 may also be applicable, in some cases.

At operation 605, the AP 102 may transmit a beacon frame that indicates a sequence of trigger frames (TFs) scheduled for transmission by the AP 102 during a beacon interval. In some embodiments, the sequence may include one or more random access TFs and at least one scheduled access TF. In some embodiments, the random access TFs may indicate allocations of channel resources for random access contention during one or more uplink transmission periods of the beacon interval. In some embodiments, the scheduled access TFs may indicate allocations of the channel resources for scheduled uplink transmissions during one or more uplink transmission periods of the beacon interval. In some embodiments, at least one of the scheduled access TFs may be included in the sequence of TFs between the first random access TF and a second random access TF subsequent to the first random access TF. In some embodiments, the channel resources may comprise one or more sub-channels that comprise a predetermined bandwidth and further comprise multiple sub-carriers.

Previously described techniques and examples for the beacon frame may be used in some cases, although embodiments are not limited as such. In some embodiments, the beacon frame may include one or more TF cascade types for the random access TFs to indicate whether next TF frames following the random access TFs in the sequence are random access TFs or scheduled access TF. For instance, a TF cascade type for a particular random access TF may refer to whether a TF scheduled for transmission immediately after that particular random access TF is a random access TF or a scheduled access TF.

At operation 610, the AP 102 may receive, during a first uplink transmission period indicated by a first random access TF in the sequence, a random access message from the STA 103. Previously described techniques and examples for the random access message may be used in some cases, although embodiments are not limited as such.

At operation 615, the AP 102 may transmit an acknowledgement (ACK) message that is based on the reception of the random access message. The ACK may include acknowledgement of one or more data blocks or messages transmitted by the STA 103 during an uplink transmission period. Referring back to the example scenario 500 in FIG. 5, the ACK 524 may be transmitted in response to the uplink transmissions 522, 523.

In some embodiments, a cascade indication bit may indicate whether or not a current random access TF is cascaded by another random access TF. In some embodiments, the cascade indication bit may be included in the current random access TF. As an example, in the example scenario 500 shown in FIG. 5, a cascade indication bit may be included in the first TF 520 to indicate whether the first TF 520 is cascaded by another random access TF.

In some embodiments, when a next TF following the first random access TF in the sequence is a scheduled access TF, the ACK may include a cascade indication bit that indicates that the first random access TF is not followed by a second random access TF. In some embodiments, when the next TF following the first random access TF in the sequence is a random access TF, the ACK may include the cascade indication to indicate that the first random access TF is not followed by a second random access TF. In some embodiments, when an ACK frame includes the cascade indication bit, the following cascaded random access TF may be restricted to not include the cascade indication bit. In some embodiments, when an ACK frame does not include the cascade indication bit, the following cascaded random access TF may include the cascade indication bit. It should be pointed out that the cascade indication bit in these cases (and others) may take values such as "0" and "1" to indicate that there is or is not another random access TF scheduled after the current random access TF.

An example of an apparatus for a user station (STA) is disclosed herein. The apparatus may comprise transceiver circuitry and hardware processing circuitry. The hardware processing circuitry may configure the transceiver circuitry to receive, from an access point (AP), a beacon frame for a beacon interval. The hardware processing circuitry may further configure the transceiver circuitry to receive a first random access Trigger Frame (TF) that indicates a first allocation of channel resources for random access contention by STAs during a first uplink transmission period of the beacon interval. The beacon frame may include a transmission timing for the first random access TF and a first TF cascade type for the first random access TF. The first TF cascade type may indicate whether a next TF is a random access TF or a scheduled access TF. In some examples, the STA may be a high-efficiency wireless local area network (HEW) STA and the AP may be an HEW AP.

In some examples, the first random access TF may be received according to the transmission timing. In some examples, the hardware processing circuitry may further configure the transceiver circuitry to transmit a random access frame during the first uplink transmission period according to the first allocation of the channel resources. In some examples, the transmission of the random access frame may be performed when a traffic indication map (TIM) included in the beacon frame indicates that the STA is scheduled to receive downlink traffic from the AP during the beacon interval and when the first TF cascade type indicates that the next TF is a scheduled access TF.

In some examples, the hardware processing circuitry may further configure the transceiver circuitry to receive the downlink traffic from the AP during a reception period indicated in the next TF. The hardware processing circuitry may further configure the transceiver circuitry to refrain from reception of signals during a sleep period between the next TF and the reception period for the downlink traffic. In some examples, the transmission of the random access frame may be performed when an indicator included in a TF indicates that the STA is scheduled to receive downlink traffic from the AP during the beacon interval and the first TF cascade type indicates that the next TF is a scheduled access TF.

In some examples, the hardware processing circuitry may further configure the transceiver circuitry to transmit, when the first TF cascade type indicates that the next TF is a random access TF, one or more uplink data blocks during the first uplink transmission period and during a second uplink transmission period indicated by the next TF. In some examples, the transmission of the uplink data blocks may be performed according to the first allocation of the channel resources during the first uplink transmission period. The transmission of the uplink data blocks may be further performed according to a second allocation of the channel resources during the second uplink transmission period. The second allocation of the channel resources may be indicated by the next TF.

In some examples, the transmission of the uplink data blocks may be performed when a traffic indication map (TIM) included in the beacon frame indicates that the STA is not scheduled to receive downlink traffic from the AP during the beacon interval. In some examples, the beacon frame may further include a transmission timing for a second random access TF and a second TF cascade type for the second random access TF. In some examples, the beacon interval may include a scheduled access TF transmitted between the first random access TF and the second random access TF.

In some examples, the channel resources may comprise one or more sub-channels that comprise a predetermined bandwidth and further comprise multiple sub-carriers. In some examples, the STA may further comprise one or more antennas coupled to the transceiver circuitry for the reception of the beacon frame and the reception of the first random access TF.

An example of a non-transitory computer-readable storage medium that stores instructions for execution by one or more processors of a user station (STA) to perform operations for communication is also disclosed herein. The operations may configure the one or more processors to receive a beacon frame that indicates a sequence of random access trigger frames (TIM) and scheduled access TFs to be transmitted by an access point (AP), the TFs indicating timings for one or more uplink transmission periods. The operations may further configure the one or more processors to determine, based on one or more TF cascade types included in the beacon frame, a first random access TF that is followed immediately by a second random access TF in the sequence. The operations may further configure the one or more processors to transmit a first portion of an uplink traffic message during a first uplink transmission period indicated by the first random access TF and transmit a second portion of the uplink traffic message during a second uplink transmission period indicated by the second random access TF.

In some examples, the determination of the first random access TF and the transmissions of the first and second portions of the uplink traffic message may be performed when a traffic indication map (TIM) included in the beacon frame indicates that the STA is not scheduled to receive downlink traffic from the AP during the beacon interval. In some examples, the operations may further configure the one or more processors to, when the TIM indicates that the STA is scheduled to receive downlink traffic from the AP during the beacon interval, determine, based on the TF cascade types, a third random access TF that is followed immediately by a scheduled access TF in the sequence. The operations may further configure the one or more processors to, when the TIM indicates that the STA is scheduled to receive downlink traffic from the AP during the beacon interval, transmit a random access message during a third uplink transmission period indicated by the third random access TF and receive the downlink traffic during an uplink transmission period indicated by the scheduled access TF.

In some examples, the random access TF's may further indicate allocations of channel resources for random access contention by STAs during one or more of the uplink transmission periods.

An example of a method of communication performed at a user station (STA) is also disclosed herein. The method may comprise receiving, from an access point (AP), a beacon frame for a beacon interval. The method may further comprise receiving a first random access Trigger Frame (TF) that indicates a first allocation of channel resources for random access contention by STAs during a first uplink transmission period of the beacon interval. The beacon frame may include a transmission timing for the first random access TF and a first TF cascade type for the first random access TF. The first TF cascade type may indicate whether a next TF is a random access TF or a scheduled access TF. In some examples, the STA may be a high-efficiency wireless local area network (HEW) STA and the AP may be an HEW AP.

An example of an apparatus for an access point (AP) is also disclosed herein. The apparatus may comprise transceiver circuitry and hardware processing circuitry. The hardware processing circuitry may configure the transceiver circuitry to transmit a beacon frame that indicates a sequence of trigger frames (TFs) scheduled for transmission by the AP during a beacon interval. The sequence may include one or more random access TFs and at least one scheduled access TF. The hardware processing circuitry may further configure the transceiver circuitry to receive, during a first uplink transmission period indicated by a first random access TF in the sequence, a random access message from a user station (STA). The beacon frame may include one or more TF cascade types for the random access TFs to indicate whether next TF frames following the random access TFs in the sequence are random access TFs or scheduled access TF.

In some examples, the random access TFs may indicate allocations of channel resources for random access contention during one or more uplink transmission periods of the beacon interval. The scheduled access TFs may indicate allocations of the channel resources for scheduled uplink transmissions during one or more uplink transmission periods of the beacon interval. In some examples, the channel resources may comprise one or more sub-channels that comprise a predetermined bandwidth and further comprise multiple sub-carriers. In some examples, at least one of the scheduled access TFs may be included in the sequence of TFs between the first random access TF and a second random access TF subsequent to the first random access TF.

In some examples, the hardware processing circuitry may further configure the transceiver circuitry to transmit an acknowledgement (ACK) message that is based on the reception of the random access message. In some examples, when a next TF following the first random access TF in the sequence is a scheduled access TF, the ACK may include a cascade indication bit that indicates that the first random access TF is not followed by a second random access TF. In some examples, when a next TF following the first random access TF in the sequence is a random access TF, the ACK may include a cascade indication bit that indicates that the first random access TF is not followed by a second random access TF.

In some examples, the apparatus may further comprise one or more antennas coupled to the transceiver circuitry for the transmission of the beacon frame and the reception of the random access message.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) station, the apparatus comprising: memory; and processing circuitry coupled to the memory, the processing circuitry configured to:
    decode a beacon frame or management frame from a HE access point (AP), the beacon frame or the management frame comprising an information element, the information element comprising a start time for a first trigger frame (TF) with random access allocations;
    enter a doze state until the start time;
    decode the first TF, the first TF comprising a cascade indication field and an indication of uplink (UL) allocations, the UL allocations comprising one or more random access allocations, wherein the one or more random access allocations are indicated by values of association identifications (AIDs);
    determine whether the one or more random access allocations are accessible to transmit a packet, wherein the determination is based on the values of the AIDs being zero to indicate a random access allocation;
    if the determination is the one or more random access allocations are accessible, select a random access allocation of the one or more random access allocations, and configure the HE station to transmit the packet in accordance with the selected random access allocation, wherein the memory is configured to store the beacon frame or the management frame.

2. The apparatus of claim 1, wherein the processing circuitry is further configured to:

randomly select the random access allocation from the one or more random access allocations.

3. The apparatus of claim 1, wherein the processing circuitry is further configured to:
if the determination is the one or more random access allocations are accessible and the value of the cascade indication field is 1, remain awake for a second TF with random access allocations.

4. The apparatus of claim 1, wherein the information element further comprises one or more additional start times for TFs with random access allocations.

5. The apparatus of claim 4, wherein the information element further comprises a length field indicating a length of the information element.

6. The apparatus of claim 1, wherein the processing circuitry is further configured to:
configure the HE station to transmit the packet in accordance with one or both of: orthogonal frequency-division multiple access (OFDMA) and multi-user multiple-input multiple-output (MU-MIMO).

7. The apparatus of claim 1, wherein the packet is an uplink resource request, an association request, or a probe request.

8. The apparatus of claim 1, wherein the beacon frame further comprises a traffic indication map (TIM) that indicates whether the HE AP has downlink traffic for the HE station.

9. The apparatus of claim 1, wherein the selected random access allocation comprises an indication of channel resources for random access contention by stations during an uplink transmission period, and wherein the channel resources comprise subcarriers for orthogonal frequency division multiplexing (OFDM).

10. The apparatus of claim 1, wherein the processing circuitry is further configured to:
if the determination is the one or more random access allocations are not accessible, and the value of the cascade field is 0, enter the doze state immediately.

11. The apparatus of claim 1, wherein the HE station is configured to operate in a wireless local area network (WLAN).

12. The apparatus of claim 1, wherein the HE station is configured to operate in accordance with Institute of Electronic and Electrical Engineers (IEEE) 802.11ax.

13. The apparatus of claim 1, wherein the apparatus further comprises: transceiver circuitry coupled to the processing circuitry; and, one or more antennas coupled to the transceiver circuitry.

14. A non-transitory computer-readable storage medium that stores instructions for execution by one or more processors of a high-efficiency (HE) station, the instructions to configure the one or more processors to:
decode a beacon frame or management frame from a HE access point (AP), the beacon frame or the management frame comprising an information element, the information element comprising a start time for a first trigger frame (TF) with random access allocations;
enter a doze state until the start time;
decode the first TF, the first TF comprising a cascade indication field and an indication of uplink (UL) allocations, the UL allocations comprising one or more random access allocations, wherein the one or more random access allocations are indicated by values of association identifications (AIDs);
determine whether the one or more random access allocations are accessible to transmit a packet, wherein the determination is based on the values of the AIDs being zero to indicate a random access allocation;
if the determination is the one or more random access allocations are accessible, select a random access allocation of the one or more random access allocations, and configure the HE station to transmit the packet in accordance with the selected random access allocation, wherein the memory is configured to store the beacon frame or the management frame.

15. The non-transitory computer-readable storage medium of claim 14, wherein the instructions further configure the one or more processors to:
randomly select the random access allocation from the one or more random access allocations.

16. The non-transitory computer-readable storage medium of claim 14, wherein the instructions further configure the one or more processors to:
if the determination is the one or more random access allocations are accessible and the value of the cascade indication field is 1, remain awake for a second TF with random access allocations.

17. The non-transitory computer-readable storage medium of claim 14, wherein the information element further comprises one or more additional start times for TFs with random access allocations.

18. The non-transitory computer-readable storage medium of claim 17, wherein the information element further comprises a length field indicating a length of the information element.

19. A method performed by an apparatus of a high-efficiency (HE) station, the method comprising:
decoding a beacon frame or management frame from a HE access point (AP), the beacon frame or the management frame comprising an information element, the information element comprising a start time for a first trigger frame (TF) with random access allocations;
entering a doze state until the start time;
decoding the first TF, the first TF comprising a cascade indication field and an indication of uplink (UL) allocations, the UL allocations comprising one or more random access allocations, wherein the one or more random access allocations are indicated by values of association identifications (AIDs);
determining whether the one or more random access allocations are accessible to transmit a packet, wherein the determination is based on the values of the AIDs being zero to indicate a random access allocation; and
if the determination is the one or more random access allocations are accessible, selecting a random access allocation of the one or more random access allocations, and configure the HE station to transmit the packet in accordance with the selected random access allocation, wherein the memory is configured to store the beacon frame or the management frame.

20. The method of claim 19, wherein the method further comprises:
randomly selecting the random access allocation from the one or more random access allocations.

21. An apparatus of an access point, the apparatus comprising: memory; and processing circuitry coupled to the memory, the processing circuitry configured to:
encode a beacon frame or management frame, the beacon frame or the management frame comprising an information element, the information element comprising a start time for a first trigger frame (TF) with random access allocations;

encode the first TF with random access allocations, the first TF with random access allocations comprising a cascade indication field and an indication of uplink (UL) allocations, the UL allocations comprising one or more random access allocations, wherein the one or more random access allocation are indicated by values of association identifications (AIDs), and wherein a value of an AID of the AIDs being zero indicates a random access allocation;

configure the access point to transmit the first TF with random access allocations at the start time;

if the cascade indication field is encoded with a 1, encode a second TF with random access allocations, the second TF with random access allocations comprising a second cascade indication field and one or more second random access allocations, and configure the access point to transmit the second TF with random access allocations after a transmission period for the first TF with random access allocations is completed; and if the cascade indication field is encoded with a 0, refrain from encoding and configuring the access point to transmit a second TF with random access allocations as a next frame to transmit, wherein the memory is configured to store the beacon frame and the management frame.

22. The apparatus of claim 21, wherein the processing circuitry is further configured to:

if the cascade indication field is encoded with a 1, encode a second TF with random access allocations, the second TF with random access allocations comprising a second cascade indication field and one or more second random access allocations, configure the access point to transmit the second TF with random access allocations after a transmission period for the first TF with random access allocations is completed, and decode uplink packets from one or more stations in accordance with the random access allocations.

23. The apparatus of claim 21, wherein the random access allocations comprise indications of channel resources for random access contention by stations during an uplink transmission period, and wherein the channel resources comprise subcarriers for orthogonal frequency division multiplexing (OFDM).

24. The apparatus of claim 21, wherein the access point is configured to operate in accordance with Institute of Electronic and Electrical Engineers (IEEE) 802.11ax, and wherein the access point is a high-efficiency (HE) access point configured to operate in a wireless local area network (WLAN).

25. The apparatus of claim 21, wherein the apparatus further comprises: transceiver circuitry coupled to the processing circuitry; and, one or more antennas coupled to the transceiver circuitry.

* * * * *